(No Model.)
G. W. HUDDLESTON.
CULTIVATOR FENDER SUPPORT.
No. 468,418. Patented Feb. 9, 1892.
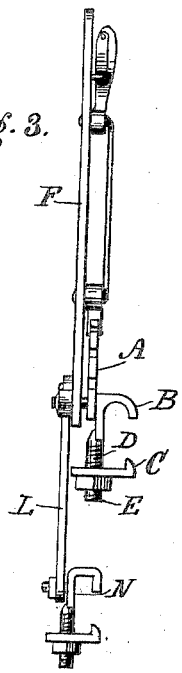
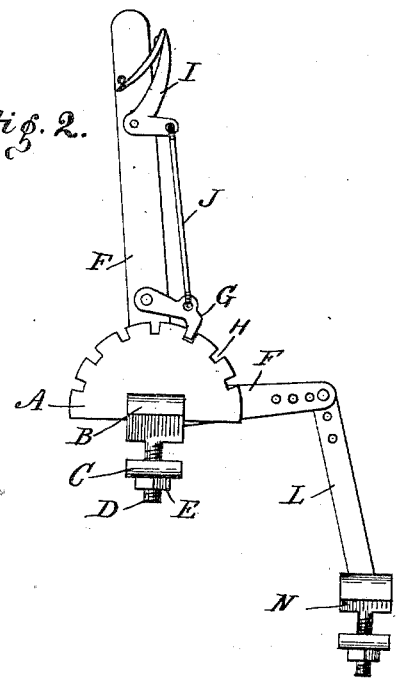
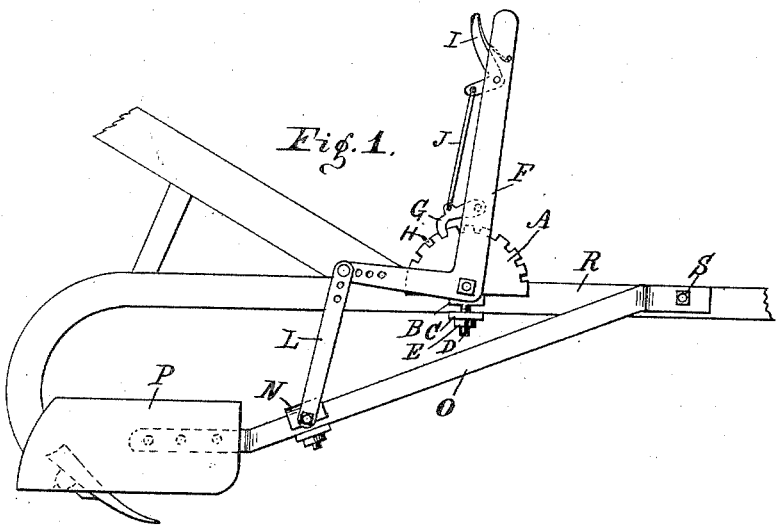
WITNESSES:
V. M. Hood.
C. K. Hood.
INVENTOR
George W. Huddleston.
BY
H. P. Hood,
ATTORNEY

United States Patent Office.

GEORGE W. HUDDLESTON, OF THORNTOWN, INDIANA.

CULTIVATOR-FENDER SUPPORT.

SPECIFICATION forming part of Letters Patent No. 468,418, dated February 9, 1892.

Application filed May 28, 1891. Serial No. 394,369. (No model.)

*To all whom it may concern:*

Be it known that I, GEORGE W. HUDDLESTON, a citizen of the United States, residing at Thorntown, in the county of Boone and State of Indiana, have invented a new and useful Improvement in Cultivator-Fender Supports, of which the following is a specification.

My invention relates to an improved device for adjustably supporting a plant or clod fender for the plow or plows of a cultivator.

The object of my improvement is to provide means for adjustably supporting the fender at any desired height above the surface of the ground in such a manner that the downward movement of the fender will be limited, while it is still free to move upward to adjust itself to the inequalities of the surface.

The accompanying drawings illustrate my invention.

Figure 1 represents a side elevation showing my device in position on a cultivator. Fig. 2 is a side elevation of the opposite side of my device on a larger scale. Fig. 3 is a view at right angles to that shown in Fig. 2.

In the drawings, A is a bracket having a fixed jaw B and a movable jaw C, which is mounted on a screw-threaded extension D of the fixed jaw, and is adjusted thereon by means of a nut E. Pivoted to said bracket so as to swing thereon in vertical plane is a bent lever F, which is adjustably held in position relatively to the bracket by a pawl G, which is pivoted at one end to the lever and engages at the other end either of a series of notches H, formed in the upper edge of bracket A. Pawl G is controlled and operated by a grip-lever I and link J. From the lower end of lever F a link L is suspended, having at its lower end a clamp N, which is adapted to grasp and hold the shank O of the fender P, which is pivoted to the plow-beam R at S, and is arranged to extend backward alongside the plows of the cultivator in the usual well-known manner.

In operation the bracket A is secured to the plow-beam R or some other fixed portion of the cultivator by means of the jaws B and C, and link J is connected with the shank of the fender by means of the clamp N. By means of the lever F the fender may now be raised and held suspended any required distance above the ground-surface, so that in plowing a greater or less amount of earth may pass from the plows beneath the fender to the plants, the fender being at the same time free to rise in passing over clods or other inequalities.

I claim as my invention—

1. The above-described fender-support, consisting of the bracket adapted to be detachably secured to a fixed portion of a cultivator-frame, as the plow-beam, the bent lever pivoted to said bracket so as to swing in a vertical plane thereon, the pawl pivoted to said lever and arranged to engage said bracket, and the link pivoted to the lower end of the lever and provided at its opposite end with a clamp, all combined and arranged to co-operate with each other and with the fender of a cultivator, substantially as set forth.

2. The combination, with the plow-beam and plows of a cultivator, of a fender pivoted to the plow-beam so as to swing in a vertical plane thereon, a bracket secured to the plow-beam, a lever pivoted to the bracket so as to swing in a vertical plane thereon, a pawl pivoted to the lever and arranged to engage the bracket, and a link pivoted at one end to the lower end of the lever and secured at the other end to the fender, all arranged to co-operate substantially as set forth, whereby the fender is adjustably supported, as set forth.

GEORGE W. HUDDLESTON.

Witnesses:
   O. B. BEADLE,
   JOSEPH FLANIGAN.